March 14, 1933.   E. B. HUDSON   1,900,933
AUTOMATIC GAUGE FOR SHEET METAL SHEARS
Filed Jan. 10, 1929   5 Sheets-Sheet 1
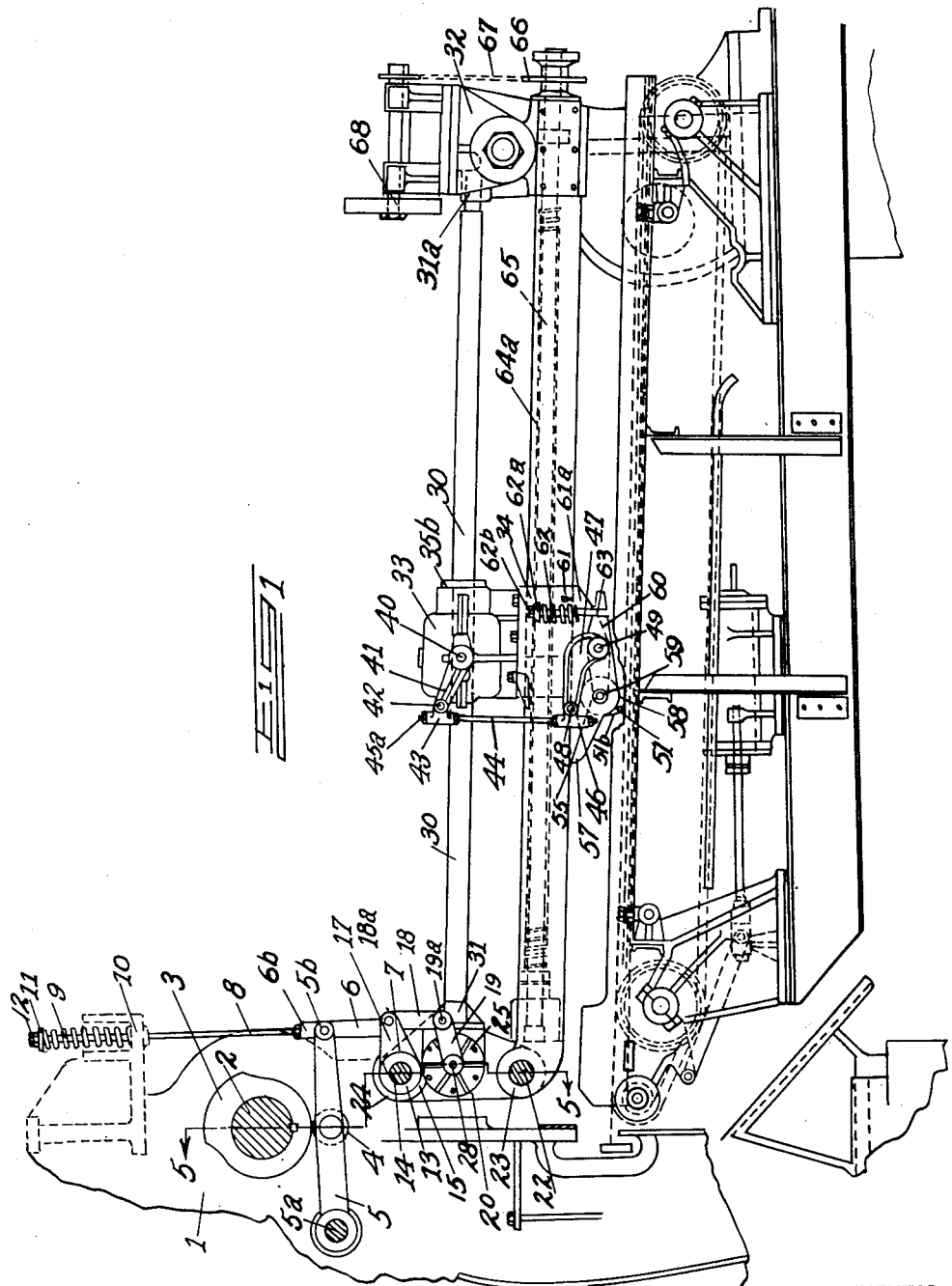
INVENTOR.
Edwin B. Hudson
Allen + Allen
ATTORNEY.

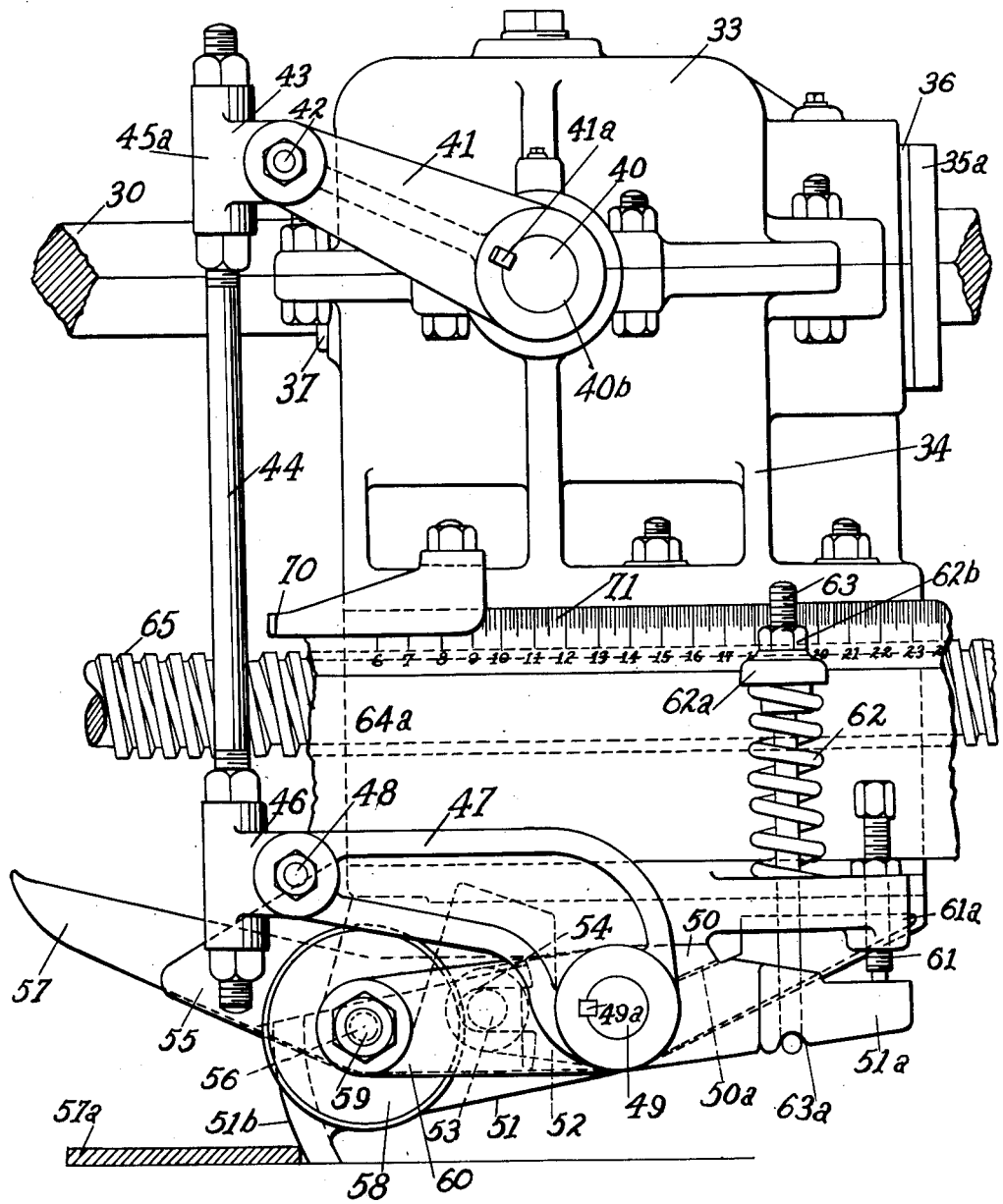

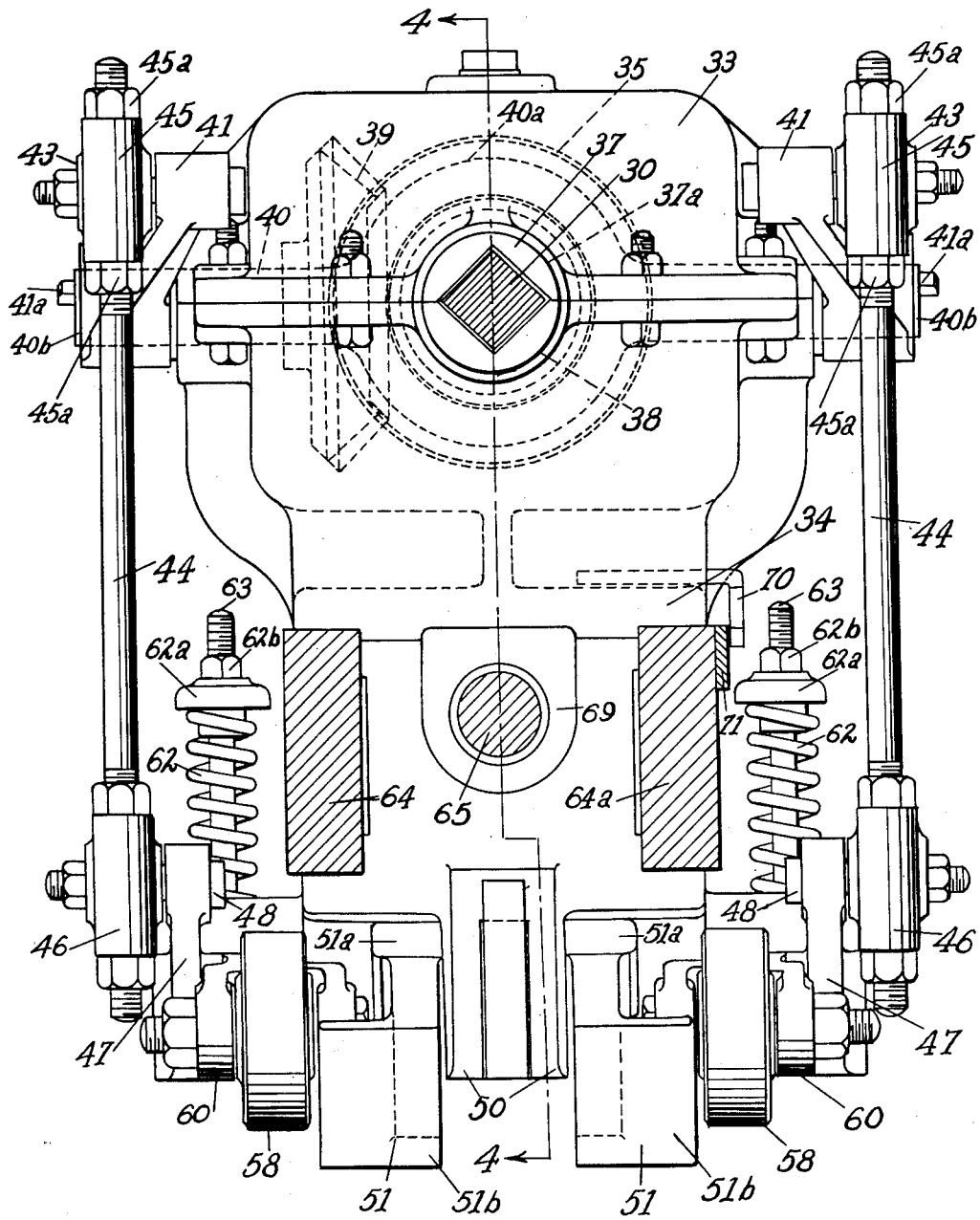

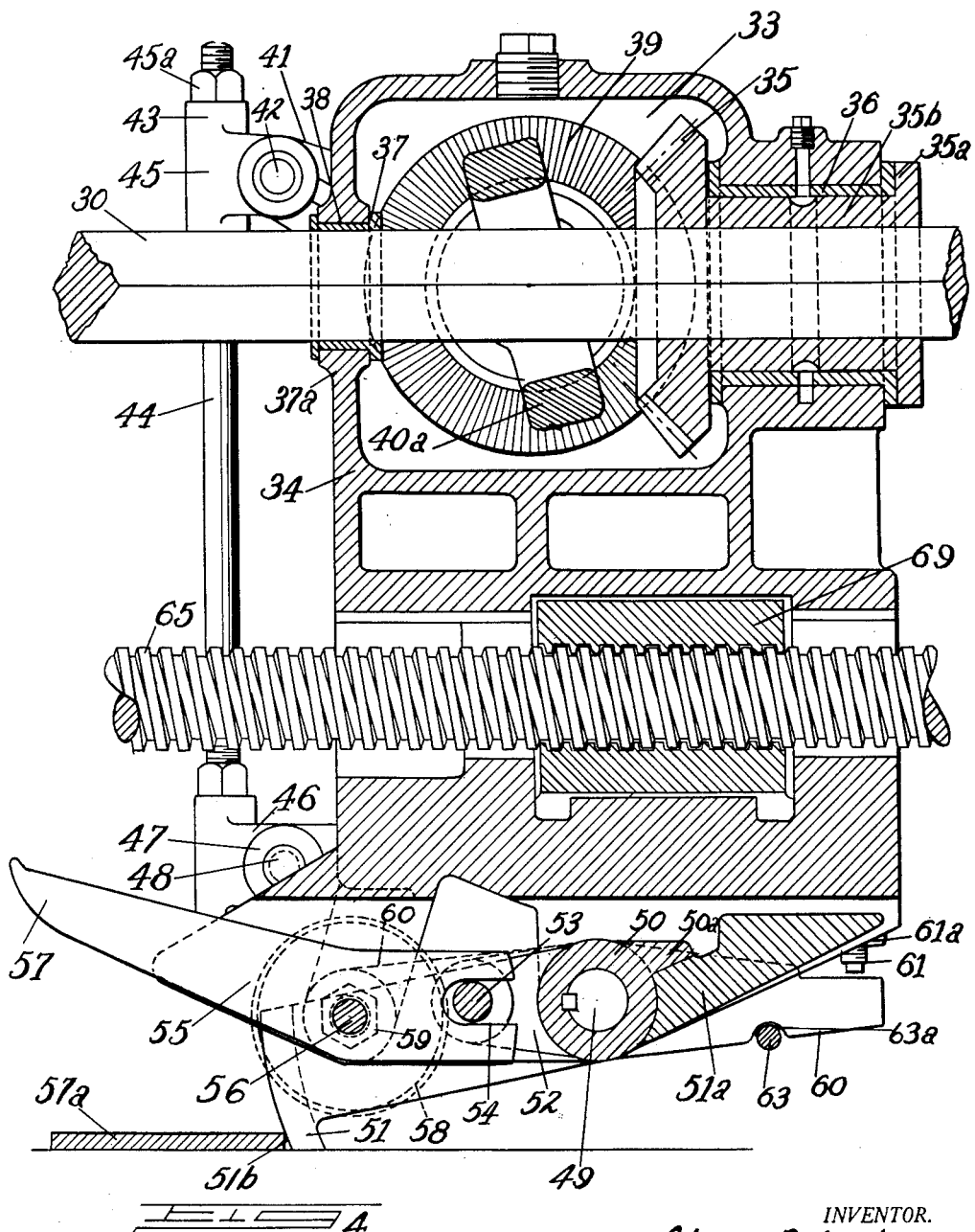

March 14, 1933.  E. B. HUDSON  1,900,933
AUTOMATIC GAUGE FOR SHEET METAL SHEARS
Filed Jan. 10, 1929    5 Sheets-Sheet 5
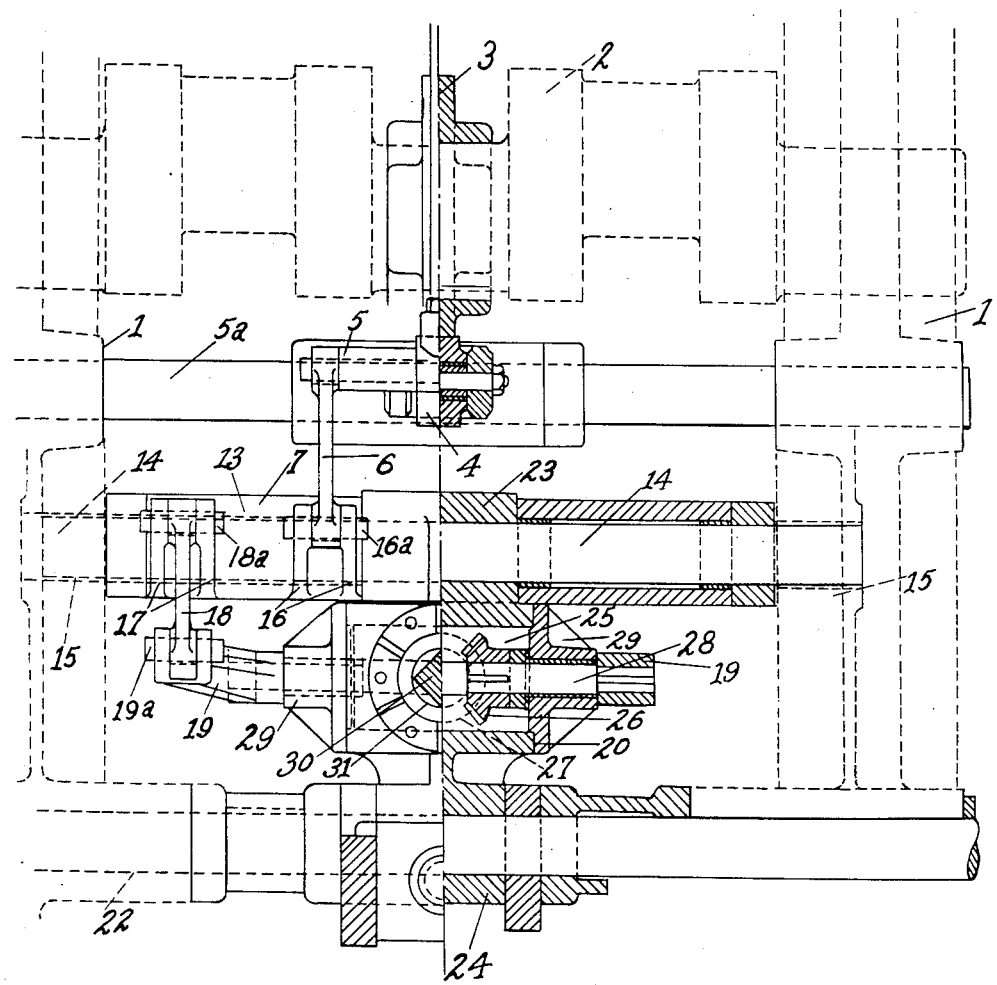
INVENTOR.
Edwin B. Hudson
BY Allen + Allen
ATTORNEY.

Patented Mar. 14, 1933

1,900,933

UNITED STATES PATENT OFFICE

EDWIN B. HUDSON, OF BUTLER, PENNSYLVANIA, ASSIGNOR TO THE AMERICAN ROLLING MILL COMPANY, OF MIDDLETOWN, OHIO, A CORPORATION OF OHIO

AUTOMATIC GAUGE FOR SHEET METAL SHEARS

Application filed January 10, 1929. Serial No. 331,432.

My invention provides an automatic and adjustable stop gauge which is synchronized with the operation of the cutting element of a shear.

With the type of gauges now in use the operator must divide his attention between the knife, gauge and table. After the shearing stroke the operator must actuate mechanism to remove the stop, and permit the sheared piece to traverse the table. Since the entire tonnage of any sheet plant passes through the shears, the efficiency and the production of the entire plant is affected by slow and inefficient operation of the shears. With my device the operator's attention is required on the shears alone and since the stops are automatic and operate simultaneously with the shear, production is materially increased.

One of my objects is to provide a stopping means to determine the length of a piece to be cut, which means is adjustable with relation to the cutting knife and is operated automatically.

Another object is to provide a gauging device, which will eliminate the dropping table on a shear and permit the piece which has been cut, to advance without additional work on the part of the operator.

Another object is to provide a gauging device that will be operable automatically without the attention of the shearman during and after a cut, and thereby increase the production on a particular shear.

These and other objects which will be more specifically pointed out hereinafter or will be obvious to one skilled in the art who reads these specifications, I accomplish by that certain construction and arrangement of parts of which I shall now describe a preferred embodiment, reference being had to the drawings which accompany this specification.

In the drawings:

Figure 1 is a side elevation of a shear and back table showing my stop gauge attached thereto.

Figure 2 is a side elevation of the entire stop mechanism with interconnecting parts shown in part.

Figure 3 is a front view of the parts shown in Figure 2.

Figure 4 is a section taken on the lines 4—4 of Figure 3.

Figure 5 is a view part full and part in section taken on the line 5—5 in Figure 1.

Broadly my invention contemplates the provision of rails above the back table, stop or gauge means slidably mounted upon these rails so as to be adjustable to vary the length of cut, and means operatively connecting the gauge means with the shear so that the stop is automatically removed at the end of the shearing stroke. In the preferred embodiment shown, this operative connection is effected by a squared shaft parallel with the rails, actuated by the shear mechanism, and actuating the stop mechanism.

I have shown a side frame 1 of a shear in which a crank shaft 2 is rotatively mounted for driving the knife of the shear. Upon this crank shaft is fixed, in proper timing, a cam 3 for engaging the roller 4, centrally located on a pivoted lever 5. This pivoted lever is rotatively supported on a rod 5a which is fixed in the main frame of the shear. The other end 5b of the lever is connected by a vertical link 6 to a rocking lever 7. In the upper end 6b of the link 6 I have adjustably mounted a spring rod 8 to pull the lever 5 upward and to hold the roller mounted thereon in contact with the cam. Surrounding the upper end of this spring rod is a spring 9 which bears against a fixed portion 10 of the frame 1 and is prevented from sliding off the rod by means of a collar 11 held in place by two lock nuts 12. These nuts are also used to regulate the pressure of the spring. For each rotation of the shear crank shaft and the cam thereon, the lever and spring rod will be pressed downward and held there for the length of the dwell on the cam. When the dwell or high spot of the cam has passed by the roller, the spring will pull the lever to the position shown in Figure 1.

The rocking levers 7 comprise an elongated boss 13 (see Figure 5) rotatively mounted on a rod 14 supported in the main frames at 15. Extending from the elongated boss are two bracket arms 16 in the end of which is rotatively connected the link 6 by means of a pin 16a. At the left end of the elongated boss (see Figure 5) there are similar bracket arms 17 in the ends of which is rotatably mounted by the pin 18a, another link 18 which in turn is connected by the pin 19a to a crank arm 19 for transmitting the motion of the rocking lever to the gears in the housing (to be explained).

The gear housing 20 is supported on rods 14 and 22, extending between the main frames of the shear. It is supported on the rods by means of the bosses 23 and 24 midway between the two frames, and is held in a set position. The main central portion 25 comprises a housing for bevel gears 26 and 27. Gear 26 is keyed to a shaft 28 rotatively mounted in bearings 29 of the gear housing. This shaft is rotated by means of the crank arms 19 which are fixed to it and cause the shaft with the gear 26 thereon to rotate through a partial revolution and transmit motion from the cam to the automatic stop fingers (to be explained) through the medium of a square shaft 30 upon which is fixed the gear 27 within the gear housing and in mesh with the gear 26. I have described with particularity this mechanism, but other mechanisms are equally adapted to my invention, the essential thing being the provision of means for imparting motion to the squared shaft in synchronism with the shearing stroke of the shear.

The square shaft is rotatively mounted in a bearing 31 on the gear housing and another bearing 31a in a bracket 32 at the end of the table. This square shaft passes through another gear housing 33 which is part of the automatic stop carriage 34. Upon the shaft in a slidable manner is mounted a gear 35 with a square hole, as shown in Figures 3 and 4. This gear is fixed from sliding with relation to the automatic stop carriage by means of the shoulder 35a at the end of the sleeve bearing 35b which connects the gear proper and the shoulder. This sleeve bearing is free to rotate in the bearing 36 which is part of the automatic stop carriage. In order to give the square shaft double bearing support in the automatic stop carriage, I have provided another bushing 37 which has a square hole to fit the shaft and an external cylindrical surface 37a for free and suitable rotative support in the bearing surface 38. This last mentioned bushing is also held in non-sliding position with relation to the automatic stop carriage, but, like the gear and its sleeve, is free to slide with relation to the square shaft.

Meshing with the gear 35 is another gear 39 displaced ninety degrees and also rotatively mounted in a bearing on the automatic stop carriage. This gear is fixed to a shaft 40, in the same horizontal plane as the squared shaft, but having a ring 40a in the center to permit the square shaft to pass through it. The ends 40b of the shaft extend beyond the gear housing, and bear the crank arms 41 held non-rotatably by means of a key 41a. The shaft 40 does not make a complete revolution; but oscillates through part of a revolution with each stroke of the shear knife.

Attached to the crank arms 41 by means of a pin 42 is a connecting rod support 43 which is free to rotate on the pin 42 in the crank arm. The connecting rod 44, for transmitting motion from the gears to a stop, is adjustably supported in a boss 45 of the connecting rod support by means of the lock nuts 45a. The lower end of the connecting rod has a similar connecting rod support 46 for connecting it to a rocker arm 47 by means of a pin 48. This rocker arm 47 is fastened to and held in place on a shaft 49 by means of a key 49a. The shaft is rotatively supported in bearings provided on the bottom of the automatic stop carriage. Upon the shaft, and keyed in place, is a dog 50 with a finger 50a at the right.

The stop member 51 is rotatively mounted on the shaft 49, and is tipped in a clockwise direction by the finger 50a of the dog 50. It consists of a right hand extending arm 51a and the stop surface 51b against which a piece of metal 57a may abut when it is being measured for length prior to being cut. During the shearing stroke, this stop 51b will be moved out of engagement with the piece and will permit it to pass through after upward return of the shear so that the stop can engage the next length of sheet to be cut.

While the stop is rising from the sheet the pin 53 in the dog 50, which fits in an open slot 54 on the right hand end of a depressing finger 55, will rotate the depressing finger upon its supporting stud 56 and cause the left end 57 of the finger to swing down and depress the sheet of metal 57a and insure its passing clear of the stop. The stud 56 supporting the depressing finger is rigidly supported in the base of the automatic carriage.

On the sides of the automatic stop carriage I have provided rollers 58 for depressing and holding a sheet to be moved in contact with the conveying means in order to insure rapid movement of the sheet by the conveyor. These rollers are rotatively mounted on pins 59 in brackets 60, which brackets are also rotatively mounted on the shaft 49 and limited as to downward movement by a stop in the form of an adjusting screw 61 mounted in an extending arm 61a of the automatic stop carriage. These rollers are normally set to apply pressure without dropping too low after a sheet has passed from beneath them. In order to apply pressure with the rollers I have provided compression springs 62 confined and compressed between the extending arms 61a and a washer 62a by means of a nut 62b. This nut is screwed onto a rod 63 and regulates the applied pressure. The rod 63 extends down through a hole in the extending arm and is connected to the roller brackets at 63a, as shown in Figure 2, where is pulls up the end 63a of the roller bracket.

Other specific forms of stop and gauge construction, than the preferred embodiment which I have described with particularity, are equally adaptable to my invention. The essential features are gauge means suitably supported, with a portion adapted to be moved into and out of operative position by a drive connected with the shear.

The automatic stop carriage is supported on rectangular members or rails 64 and 64a in a slidable manner and moved along the supporting members by means of a screw 65. This screw like the rails is supported on the shear frame, and a bracket 32 provided at the rear of the shear. The screw 65 is rotatively supported on the frame of the shear and in the bracket 32. On the end of the screw is mounted a sprocket 66 which is driven by a chain 67 coming from a gear reduction unit 68 which may be driven by a motor. A nut 69 confined within the automatic stop carriage moves this carriage when the screw is rotated. In order to facilitate the locating of the stop, I have provided an index finger 70 rigidly mounted on the carriage. This finger will point to a scale 71 fastened to one of the rails and will indicate the lengths of pieces to be cut.

I have not described the roller table or conveying means used with my gauge, because roller tables and other conveying means for a like purpose are familiar to those skilled in the art. When the cam shaft of the shear rotates the cam will push the lever 5 downward, which in turn, by means of the connecting links and cranks, will cause the gears in the housing 25 to rotate through part of a revolution. These gears impart motion to the square shaft and through it to the second set of gears in their housing 33. These gears in turn actuate the cranks and levers on the automatic stop carriage. The lever 47 rotates the shaft 49; and the dog fixed thereon tips the stop member out of contact with the piece of metal 51a which the stop has previously engaged. Simultaneously with the disengagement of the stop surface, the depressing member 57 will be rotated by the dog, so that its end will press down on a piece that has been cut and hold it down on the conveyor. Assisting the depressing finger in holding the piece on the conveyor is a set of rollers which ride over the surface of the piece. Various modifications of my invention may be made by those skilled in the art without departing from the spirit thereof, particularly such modifications as are necessary to adapt it to shears of different sizes and kinds.

Having thus described my invention, what I claim as new and desire to secure by Letters Patent, is:—

1. In combination with a shear and a table, a gauge comprising a housing slidably supported upon rails above said table, a movable stop member pivoted upon said housing, a square shaft parallel to said rails, means upon said shear to rotate said shaft at a predetermined point in said shear stroke, a bevel gear slidably but non-rotatably mounted upon said shaft in said housing, a second bevel gear meshing with said first and mounted upon a shaft at right angles to said square shaft, and operating arms connecting said second shaft to said movable stop means.

2. In combination with a shear and a table, a gauge comprising a housing slidably supported upon rails above said table, a movable stop member pivoted upon said housing, a square shaft parallel to said rails, means upon said shear to rotate said shaft at a predetermined point in said shear stroke, a bevel gear slidably but non-rotatably mounted upon said shaft in said housing, a second bevel gear meshing with said first bevel gear and mounted upon a shaft at right angles to said square shaft, and operating arms connecting said second shaft to said movable stop means, and means to move said housing along said rails, said means comprising a screw parallel to said rails and a nut in said housing.

3. In combination with a shear and table, a gauge, a rail slidably supporting said gauge with relation to said table, stop means on said gauge to stop a piece for shearing on said table, and an operative connection between said shear and said stop means for automatically removing said stop means, said stop means comprising a member having a stopping surface, a depressing member and a tipping member arranged to operate with one another in sequence.

4. In combination with a shear and table, a gauge and stop mechanism comprising a housing, a shaft in said housing, stop means pivoted on said shaft so as normally to extend into the path of articles along said table, depressing means pivoted on said housing and adapted to overlie an article when in engagement with said stop means, means on said shaft to actuate said depressing means when said stop means is being raised, and means operatively connecting said shaft with said shear.

5. In a gauge and stop mechanism, the combination of a housing, movable stop means supported by said housing, movable depressing means supported by said housing, and means to operate simultaneously said stop and depressing means, whereby said depressing means will hold down an article while said stop means is being removed from its path.

6. In combination with a shear and table, a gauge and stop mechanism comprising a housing slidably supported on rails above said table, and movable stop means on said housing, hold down means on said housing adapted to overlie an edge of an article arrested by said stop means, and means operatively connecting said stop means and said shear, whereby said stop means may be automatically lifted out of the way.

7. In combination with a shear and a support for material to be cut by the shear, a carriage adjustable along said support toward and away from said shear, a stop on said carriage movable toward and from the support, and means operatively connecting said stop with said shear, whereby the stop is moved toward the support while the shear is moving in cutting direction preliminary to cutting, and is moved away from the support while the shear is in cutting movement, said movement being operated by the movement of said shear.

8. In combination with a shear and a support for material to be cut by the shear, a carriage adjustable along said support toward and away from said shear, a stop on said carriage swinging toward and from the support on an axis transverse to said support, and means operatively connecting said stop with said shear, whereby the stop is moved toward the support while the shear is moving in cutting direction preliminary to cutting, and is moved away from the support while the shear is in cutting movement.

9. In combination with a shear and a support for material to be cut by the shear, a carriage adjustable along said support toward and away from said shear, a stop and material-depressing means movable toward and away from said support, on said carriage, means operatively connecting said stop with said shear, and means actuating said material-depressing means in material-depressing direction while said stop is moving from said support.

EDWIN B. HUDSON.